(12) United States Patent
DeKoning et al.

(10) Patent No.: US 6,334,195 B1
(45) Date of Patent: Dec. 25, 2001

(54) USE OF HOT SPARE DRIVES TO BOOST PERFORMANCE DURING NOMINAL RAID OPERATION

(75) Inventors: Rodney A. DeKoning; Donald R. Humlicek; Curtis W. Rink, all of Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 08/586,013

(22) Filed: Dec. 29, 1995

(51) Int. Cl.$^7$ ............................. H02H 3/05; H03K 19/003
(52) U.S. Cl. ................................. 714/7; 714/710
(58) Field of Search ............................ 714/7, 3, 13, 710, 714/718, 723

(56) References Cited

U.S. PATENT DOCUMENTS

| | | | |
|---|---|---|---|
| 4,434,487 | * 2/1984 | Rubinson et al. | 371/10.1 |
| 4,914,656 | * 4/1990 | Dunphy et al. | 371/10.2 |
| 4,989,205 | * 1/1991 | Dunphy et al. | 371/10.1 |
| 4,989,206 | * 1/1991 | Dunphy et al. | 371/10.2 |
| 5,077,736 | 12/1991 | Dunphy, Jr. et al. | 371/10.1 |
| 5,124,987 | * 6/1992 | Milligan et al. | 371/10.2 |
| 5,140,592 | * 8/1992 | Idleman et al. | 371/8.1 |
| 5,274,645 | * 12/1993 | Idleman et al. | 371/21.1 |
| 5,297,258 | 3/1994 | Hale et al. | 395/275 |
| 5,418,925 | 5/1995 | DeMoss et al. | 395/425 |

* cited by examiner

Primary Examiner—Dieu-Minh Le

(57) ABSTRACT

A method and apparatus for increasing performance in a data processing system. The data processing system includes a plurality of storage devices and a backup storage device. The backup storage device is configured as a log device. Data is logged to the backup storage device after the backup storage device has been configured as a log device. In response to a failure of a storage device within the plurality of storage devices, the backup storage device is reconfigured to be used as a replacement for the failed storage device.

32 Claims, 3 Drawing Sheets

USE OF HOT SPARE DRIVES TO BOOST PERFORMANCE DURING NOMINAL RAID OPERATION

BACKGROUND OF THE INVENTION

1. Technical Field

The present invention relates generally to an improved data processing system, and in particular to an improved storage architecture in a data processing system. Still more particularly, the present invention relates to a method and apparatus for using spare storage devices to increase performance during RAID operations.

2. Description of the Related Art

In data processing systems, inexpensive high performance, high reliability memory is desirable. It is expensive to provide high reliability capability for various memory devices that are used within a data processing system. The problem becomes especially severe in the case of disk drive memory systems. Large disk drives capable of storing over one gigabytes of data are available. In many designs, the processor in the data processing system stores data files on the disk drive memory by writing the data for all files onto a single disk drive. The failure of such a single disk drive can result in the loss of significant amounts of data. Disk drives that are built to be high reliability units to minimize the possibility of this catastrophic loss of data. The cost of reliability, however, is high because reliable disk drives are expensive.

In critical situations, where the loss of data stored on the drive could cause a significant disruption in the operation of the processor in the data processing system, additional reliability may be obtained by disk "shadowing" or backing up each disk drive with an additional redundant disk drive. The provision of a second disk drive, however, to back up the primary disk drive will typically more than double the cost of storage for the data processing system. Various storage architectures have been presented to reduce the cost of providing disk shadowing backup protection. One architecture involves storing only changes that are made to the data stored on the disk drive. Another backs up only the most critical data stored on the disk drive. Yet another architecture periodically backs up data by storing it on a much less expensive data storage unit that also has a much slower data retrieval access time.

Another alternative for providing reliable storage includes using a number of smaller sized disk drives interconnected in a parallel array. In such a system, the microprocessor in the data processing system views the array of storage devices as a very large logical storage device with logical tracks thereon. Each logical track would be many times larger than any physical track extent of any of the physical storage devices forming the array. Such an architecture is often referred to as a direct access storage device (DASD) array, which includes a set of synchronously selected and operated DASDs.

One particular form of a DASD array is a redundant array of inexpensive disks (RAID) storage system, which has emerged as an alternative to large, expensive disk drives for use within data processing systems. Five different RAID levels are described in an article entitled "A Case For Redundant Arrays of Inexpensive Disks (RAID)" by David Patterson, et al., University of California Berkeley Report, No. UCD/CSD 87/391, December 1987. In traditional RAID systems, configurations typically involve one or two controllers that share drives in a protected environment. In this protected environment, disk drives are managed fairly simply because they are easily identified with the storage subsystem to which they are attached.

In these types of systems, disk drives within a disk drive storage subsystem may be designated as a hot spare device (HSD) that may be used by one or more controllers in the storage subsystem as a spare or replacement for another disk drive in the event that a disk drive within the storage subsystem fails. This set up provides for higher availability of data to the user, as well as a higher performance as a result of a quicker return to optimal redundancy modes after a device failure. In typical configurations, however, disk drives designated as hot spare devices are not used during normal operation, when other disk drives in the disk drive storage subsystem are working properly.

Therefore, it would be advantageous to have an improved method and apparatus for using HSDs or spare disk drives during normal operations to increase performance of a data processing system.

SUMMARY OF THE INVENTION

The present invention provides a method and apparatus for increasing performance in a data processing system. The data processing system includes a plurality of storage devices and a backup storage device. The backup storage device can be configured as a log device. After the backup storage device has been configured as a log device, data is logged to the backup storage device. In response to a failure of a storage device within the plurality of storage devices, the backup storage device is reconfigured to be used as a replacement for the failed storage device.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
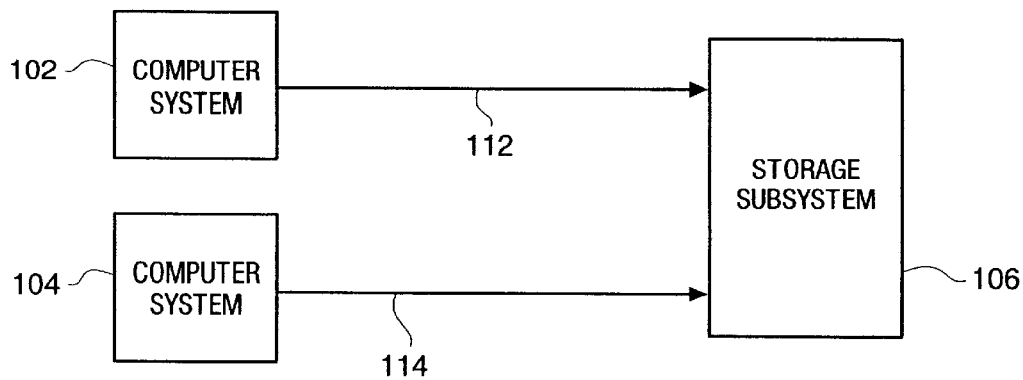
FIG. 1 is a data processing system according to the present invention.

With reference now to the figures, and in particular with reference to FIG. 1, a data processing system 100 is depicted according to the present invention. Data processing system 100 includes computer systems 102 and 104, which are connected to storage subsystem 106. In the depicted example, storage subsystem 106 is a disk drive storage subsystem. Computer systems 102 and 104 are connected to storage subsystem 106 by bus 112 and bus 114. According to the present invention, bus 112 and bus 114 may be implemented using a number of different bus architectures, such as a small computer system interface (SCSI) bus or a fibre channel bus. More information on fibre channel may be found in Stephens, *Fibre Channel, Volume 1: The Basics,* ANCOT Corporation (1195).

Figure 2:
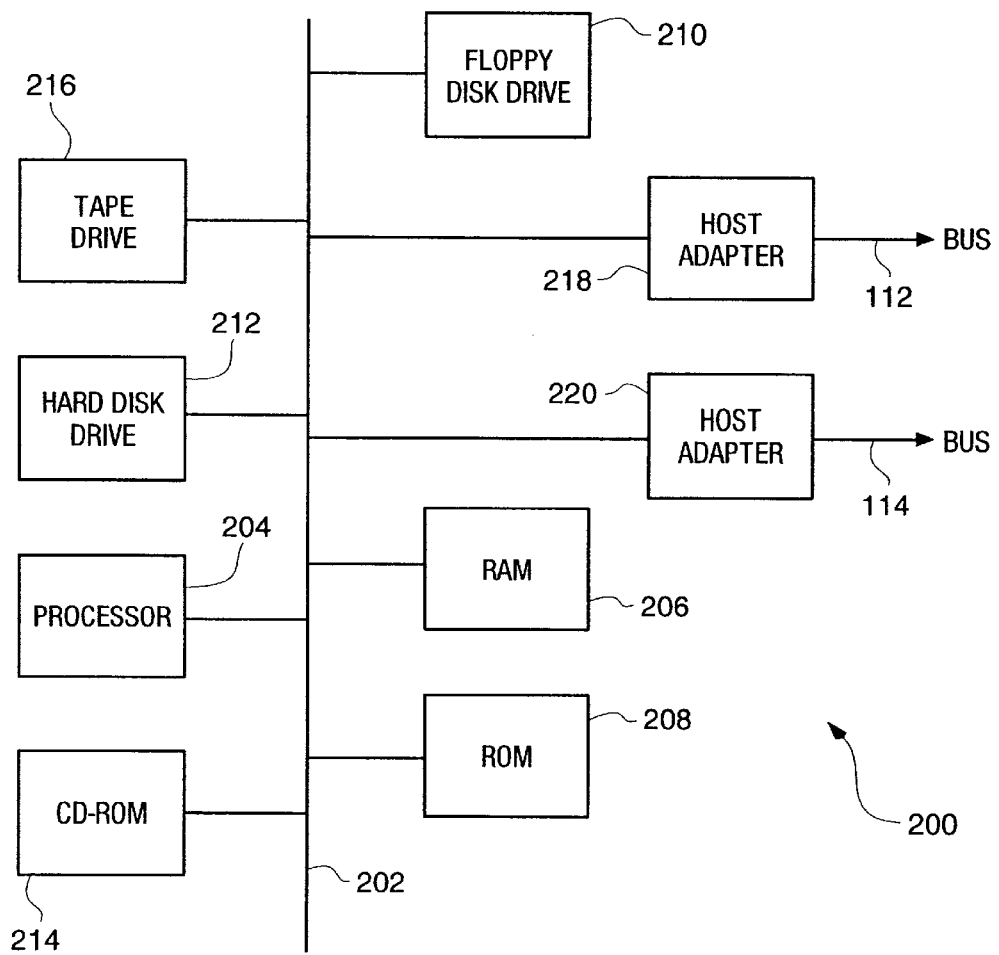
FIG. 2 is a block diagram of a computer system, such as the data processing system in FIG. 1, in which the present invention may be implemented.

Turning now to FIG. 2, a block diagram of a computer system 200, such as computer system 102 or 104 in FIG. 1, is illustrated in which the present invention may be implemented. Computer system 200 includes a system bus 202 connected to a processor 204 and a memory 206. Computer system 200 also includes a read only memory (ROM) 208, which may store programs and data, such as, for example, a basic input/output system that provides transparent communications between different input/output (I/O) devices. In the depicted example, computer system 200 also includes storage devices, such as floppy disk drive 210, hard disk drive 212, CD-ROM 214, and tape drive 216. Computer system 200 sends and receives data to a storage subsystem, such as storage subsystem 106 in FIG. 1 through host adapters 218 and 220, which are connected to buses 112 and 114, respectively. These host adapters provide an interface to send and receive data to and from a storage subsystem in a data processing system.

A storage subsystem is a collection of storage devices managed separately from the primary processing system, such as a personal computer, a work station, or a network server. A storage subsystem includes a controller that manages the storage devices and provides an interface to the primary processing system to provide access to the storage devices within the storage subsystem. A storage system is typically physically separate from the primary processing system and may be located in a remote location, such as in a separate room. These host adapters provide an interface to send and receive data to and from subsystem in a data processing system.

Programs supporting functions within host computer system 200 are executed by processor 204. While any appropriate processor may be used for processor 204, the Pentium microprocessor, which is sold by Intel Corporation and the Power PC 620, available from International Business Machines Corporation and Motorola, Inc. are examples of suitable processors. "Pentium" is a trademark of the Intel Corporation and "Power PC" is a trademark of International Business Machines Corporation.

Additionally, databases and programs may be found within a storage device, such as hard disk drive 212. Data used by processor 204 and other instructions executed by processor 204 may be found in RAM 206 and ROM 208.

Figure 3:
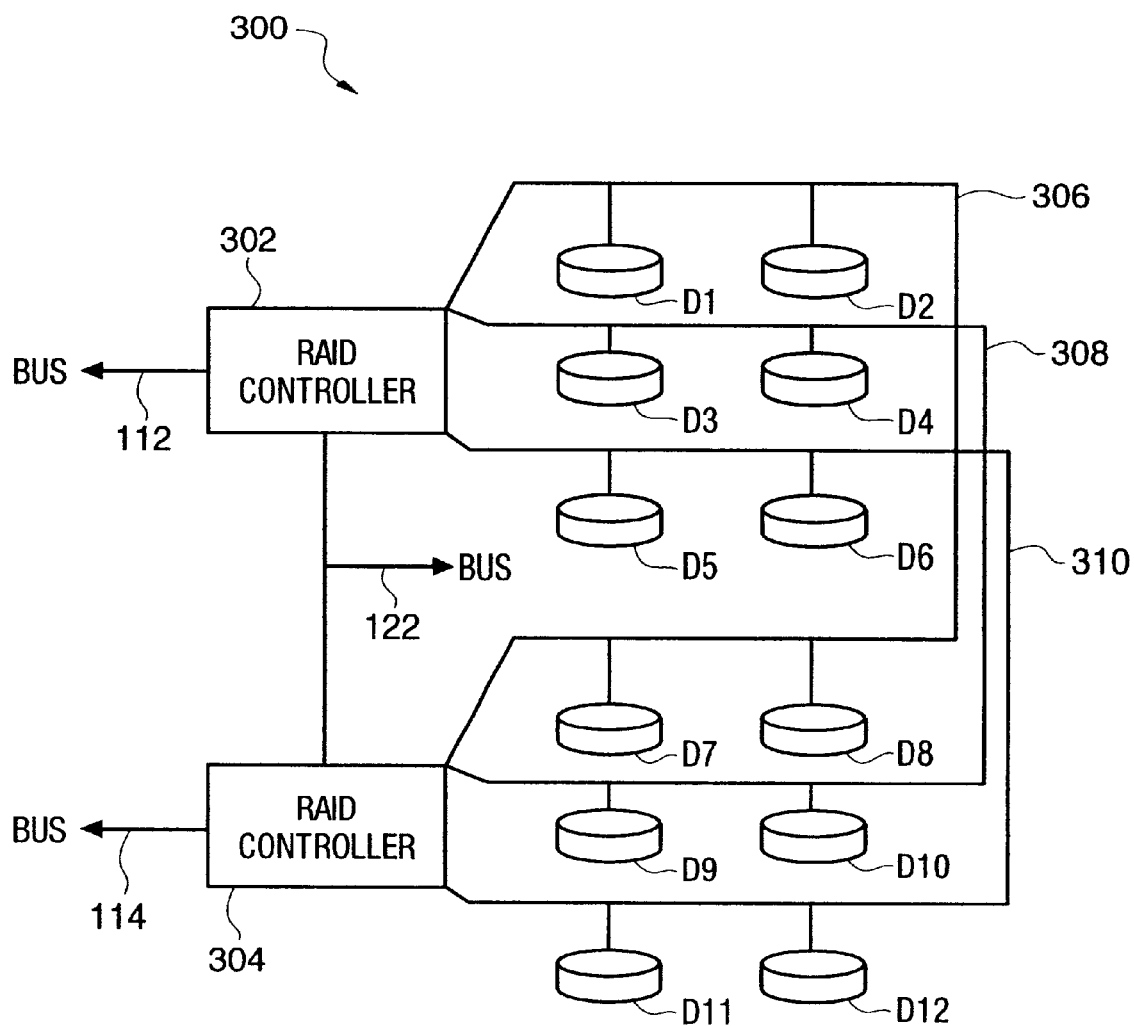
FIG. 3 is a block diagram of a storage subsystem, such as storage subsystems shown in FIG. 1, according to the present invention.

With reference now to FIG. 3, a block diagram of a storage subsystem, such as storage subsystem 106 (see FIG. 1), is depicted according to the present invention. In the depicted example, storage subsystem 300 is a disk drive (i.e., a hard disk drive) system containing controllers 302 and 304. Controller 302 is connected to bus 112 while controller 304 is connected to bus 114 (see FIG. 1). These two controllers control disk drives D1–D12 and the transfer of data to and from disk drives D1–D12 on buses 306, 308, and 310. In the depicted example, storage subsystem 300 is configured to operate as a RAID level 1, 3, or 5 configuration.

Figure 4:
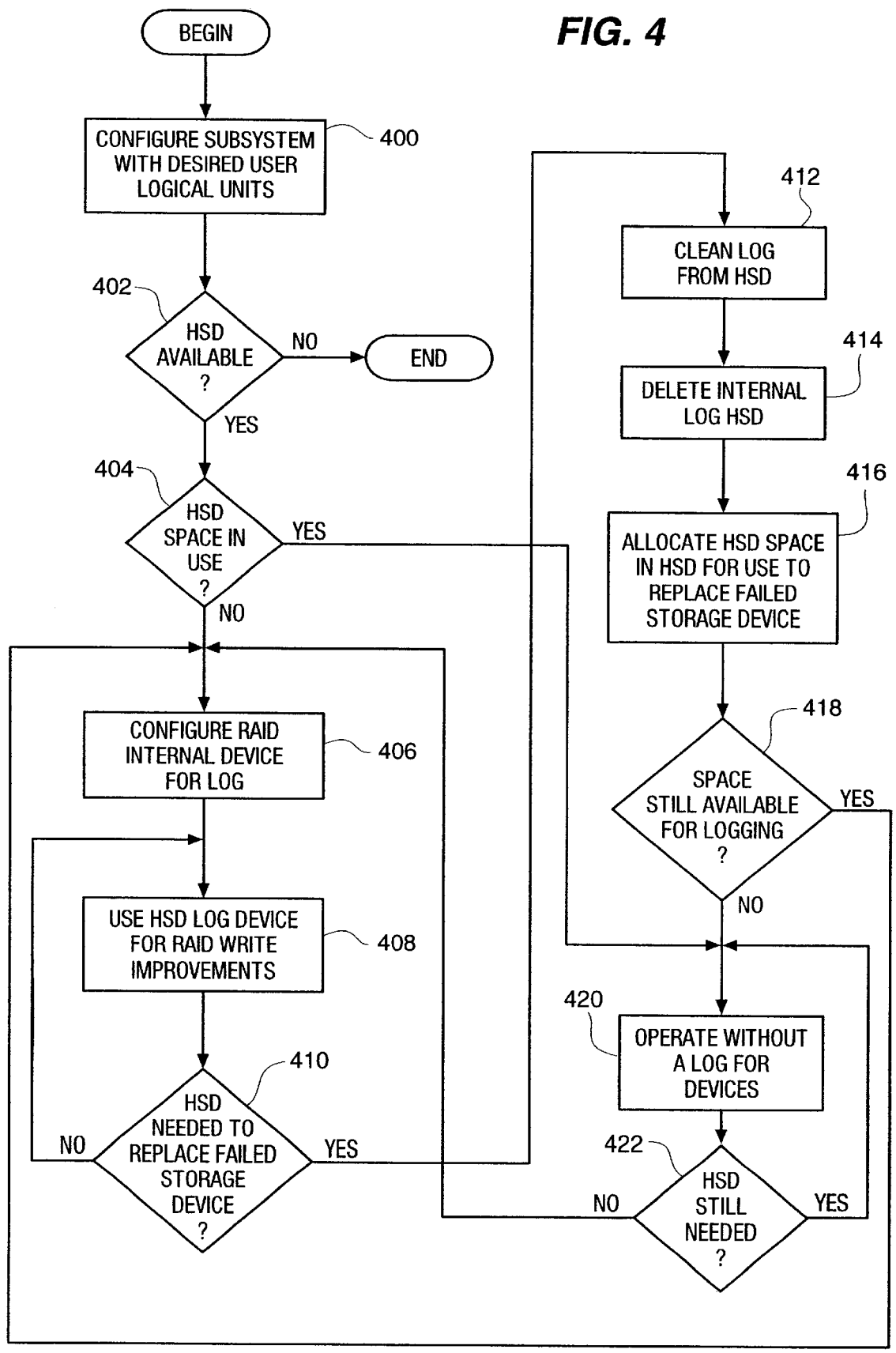
FIG. 4 is a flowchart of a process for using available hot spare devices for logging according to the present invention.

With reference now to FIG. 4, a flowchart of a process for using available hot spare devices for logging is depicted according to the present invention. The process begins by configuring the storage subsystem with desired user logical units (step 400) with the process determining whether a HSD is available in the storage subsystem (step 402). If no HSD is available, the process then terminates. Otherwise, the process determines whether the HSD is in use (step 404).

If the HSD is not in use, the process then configures the HSD as a RAID internal device for logging (step 406). The HSD is then used as a log device for RAID write improvements (step 408). More information on log or logging devices may be found in Stodolsky, et al., *Parity-Logging Disk Arrays,* ACM Transaction on Computer Systems, 12 (3): 206–35 (August 1994). Information that could be logged includes parity information, non-mapped unwritten data to the storage device, or intermediate XOR data that has yet to be scheduled. Each of these techniques may be employed to maximize performance when an HSD is used as a logging device is made available.

The process then determines whether the HSD is needed to replace a failed storage drive (step 410). If the HSD is not needed to replace a failed storage drive, the process then returns to step 408. Otherwise the process removes the log data from the HSD (step 412) and then deletes the internal log device (step 414). Thereafter, space needed for use to replace the failed storage drive is allocated within the HSD (step 416). A determination is then made as to whether space is still available within the HSD for logging procedures (step 418).

If space is available for logging, the process then returns to step 406 to configure the available portion of the HSD for logging. Otherwise, the process operates without a log for the remaining storage devices (step 420). The process also proceeds to step 420 from step 404 if an HSD is in use. Thereafter, from step 420, the process then determines whether the HSD is still needed (step 422). If the HSD is still needed, the process then returns to step 420. Otherwise, the process proceeds to step 406 as described above. The process depicted in FIG. 4 may be applied to a storage device, such as a hard disk drive. Additionally, although the figures depict a single HSD, the processes of the present invention may be applied to multiple HSDs in a storage subsystem or to HSDs located external to a storage subsystem. Although the depicted example uses an HSD for logging, an HSD also may be used for other data processing operations to improve data storage performance in a data processing system.

The processes shown in FIG. 4 may be implemented within the systems depicted in FIGS. 1–3. In particular, the processes may be implemented in computer system 200 or within controller 302 and 304 within one of the storage subsystems. The processes of the present invention also may be implemented as a computer program product in a storage device that is readable by a data processing system, wherein the storage device stores data processing system executable instructions for executing the processes of the present invention. The storage device may take various forms including, for example, but not limited to, a disk drive such as a hard disk drive, a floppy disk, an optical disk, a ROM, a RAM, and an EPROM, all of which are known to those skilled in the art. The process is stored on a storage device and is dormant until activated by using the storage device with the data processing system.

For example, a hard disk drive containing data processing system executable instructions for implementing the present invention may be connected to a processor in computer 200; a floppy disk containing data processing system executable instructions for implementing the present invention may be inserted into a floppy disk drive in computer 200; or a ROM containing data processing system executable instructions for implementing the present invention may be connected to computer 200 or to a controller in storage subsystem 300.

The present invention provides an advantage over presently available storage subsystems because HSDs are employed as logging disks when the HSDs are not required to replace failed disk drives within a storage subsystem.

Thus, the present invention provides a method and apparatus for using HSDs to enhance performance during times when disk drives in a storage subsystem have not failed, and an HSD is available, but not used. The present invention provides a mechanism for using a HSD as a logging disk during modes of operation in which the HSD is not used to replace a failed disk drive.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for increasing data storage performance, the data processing system having a plurality of storage devices and a backup storage device, the method comprising the steps of:

configuring the backup storage device as a temporary storage device to temporarily store data such that the performance of the plurality of storage devices increased;

storing the data in the backup storage device while the storage device is configured as a temporary storage device; and in response to a failure of a storage device within the plurality of storage devices, reconfiguring the backup storage device to replace the failed storage device.

2. The method according to claim 1, wherein the data is parity data, and wherein the step of storing data includes storing parity data in the backup storage device while the storage device is configured as a temporary storage device.

3. The method according to claim 1, wherein the data is non-mapped unwritten data, and wherein the step of storing data includes storing non-mapped unwritten data in the backup storage device while the storage device is configured as a temporary storage device.

4. The method according to claim 1, wherein the data is intermediate XOR data, and wherein the step of storing data includes storing intermediate XOR data in the backup storage device while the storage device is configured as a temporary storage device.

5. The method of claim 1, wherein the reconfiguring step includes:

removing the data from the backup storage device; and allocating storage space in the backup storage device for use while the backup storage device replaces the failed storage device.

6. The method of claim 5, further comprising the steps of:

determining whether temporary storage space is available in the backup storage device for storing data; and in response to temporary storage space being available, configuring the temporary storage space in the backup storage device for storing data.

7. A data processing system having increased data storage performance, the data processing system comprising:

a plurality of storage devices;

a backup storage device;

means for configuring the backup storage device as a temporary storage device to temporarily store data;

means for storing the data in the backup storage device while the storage device is configured as a temporary storage device; and means for reconfiguring the backup storage device to replace the failed storage device in response to a failure of a storage device within the plurality of storage devices.

8. The data processing system according to claim 7, wherein the data is parity data, and wherein the means for storing data includes means for storing parity data in the backup storage device while the storage device is configured as a temporary storage device.

9. The data processing system according to claim 7, wherein the data is non-mapped unwritten data, and wherein the means for storing data includes means for storing non-mapped unwritten data in the backup storage device while the storage device is configured as a temporary storage device.

10. The data processing system according to claim 7, wherein the data is intermediate XOR data that has yet to be scheduled, and wherein the means for storing data includes means for storing intermediate XOR data that has yet to be scheduled in the backup storage device while the storage device is configured as a temporary storage device.

11. The data processing system of claim 7, wherein the means for reconfiguring step includes:

means for removing the data from the backup storage device; and means for allocating storage space in the backup storage device for use while the backup storage device replaces the failed storage device.

12. The data processing system of claim 11, further comprising:

means for determining whether temporary storage space is available in the backup storage device for storing data; and means for configuring the temporary storage space in the backup storage device for storing data in response to temporary storage space being available.

13. The data processing system of claim 12, wherein the backup storage device is a disk drive.

14. A method of increasing performance in a data processing system having a plurality of storage devices and a backup storage device, the method comprising:

configuring the backup storage device as a log device;

logging data to the backup storage device after the backup storage device has been configured as a log device; and in response to a failure of a storage device within the plurality of storage devices, reconfiguring the backup storage device to replace the failed storage device.

15. The method of claim 14, wherein the reconfiguring step includes removing data from the backup storage device and allocating space in the backup storage device for use in replacing the failed storage device.

16. The method of claim 14, further comprising:

determining whether space is present in the backup storage device for logging data; and in response to space being present for logging data, configuring the available space in the backup storage device for logging data.

17. A data processing system comprising:

a plurality of storage devices;

a backup storage device;

configuration means for configuring the backup storage device as a log device;

logging means for using the backup device to perform logging operations; and reconfiguration means, responsive to a failure of a storage device within the plurality of storage devices, for reconfiguring the backup storage device to replace the failed storage device.

18. The data processing system of claim 17, wherein the reconfiguration means includes removal means for removing data from the backup storage device and allocation means for allocating space in the backup storage device for use in replacing the failed storage device.

19. The data processing system of claim 18, further comprising:

determination means for determining whether space is present in the backup storage device for logging data; and second configuration means, responsive to a determination that space is present in the backup storage device for logging data, for configuring the space present in the backup storage device for logging data.

20. The data processing system of claim 17, wherein the plurality of storage devices are disk drives.

21. The data processing system of claim 17, wherein the backup storage device is a disk drive.

22. The data processing system of claim 17, wherein the backup storage device includes a plurality of disk drives.

23. A data processing system comprising:

a plurality of storage devices; and a backup storage device, wherein the data processing system includes a plurality of modes of operation including:

a first mode of operation in which the data processing system configures the backup storage device as a log device;

a second mode of operation in which the data processing system uses the backup device to perform logging operations; and a third mode of operation in which the data processing system reconfigures the backup storage device to replace the failed storage device in response to a failure of the storage device within the plurality of storage devices.

24. The data processing system of claim 23, wherein the first mode of operation includes removing data from the backup storage device and allocating space in the backup storage device for use in replacing the failed storage device.

25. The data processing system of claim 24, further comprising:

a fourth mode of operation in which the data processing system determines whether space is present in the backup storage device for logging data; and fifth mode of operation, responsive to a determination that space is present in the backup storage device for logging data, for configuring the space present in the backup storage device, in which the data processing system logs data.

26. The data processing system of claim 25, wherein the plurality of storage devices are disk drives.

27. A program storage device readable by a data processing system, the program storage device comprising:

first instruction means for configuring the backup storage device as a log device;

second instruction means for using the backup device to perform logging operations; and third instruction means, responsive to a failure of a storage device within the plurality of storage devices, for reconfiguring the backup storage device to replace the failed storage device, wherein the instruction means are activated when the program storage device is connected to the data processing system.

28. The program storage device of claim 27, wherein the program storage device is a read only memory.

29. The program storage device of claim 27, wherein the program storage device is a hard disk drive.

30. A method in a data processing system for increasing data storage performance, the data processing system having a plurality of storage devices and a backup storage device, the method comprising steps of:

configuring the backup storage device as a temporary storage device to temporarily store data;

storing the data in the backup storage device while the storage device is configured as a temporary storage device; and in response to failure of a storage device within the plurality of storage devices, allocating at least a portion of the backup storage device for use to replace the failed storage device within the plurality of storage devices.

31. The method of claim 30 further comprising:

determining whether a portion of the backup storage device is available to store data after at least a portion of the backup storage device has been allocated for use to replace the failed storage device within the plurality of storage devices; and in response to a portion of the backup storage device being available to store data, configuring the available portion of the backup storage device to store data, wherein performance of the plurality of storage devices is increased.

32. The method of claim 31, wherein the plurality of storage devices is a plurality hard disk drives and the backup storage device is a hard disk drive.

* * * * *